United States Patent
Okumura et al.

(10) Patent No.: US 10,202,067 B2
(45) Date of Patent: Feb. 12, 2019

(54) VEHICLE LAMP CONTROL SYSTEM AND OPERATION METHOD THEREOF

(71) Applicant: DENSO CORPORATION, Kariya, Aichi-pref. (JP)

(72) Inventors: Kazuhisa Okumura, Kariya (JP); Koji Imaeda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 60 days.

(21) Appl. No.: 15/125,089

(22) PCT Filed: Mar. 6, 2015

(86) PCT No.: PCT/JP2015/056710
§ 371 (c)(1),
(2) Date: Sep. 9, 2016

(87) PCT Pub. No.: WO2015/137258
PCT Pub. Date: Sep. 17, 2015

(65) Prior Publication Data
US 2017/0015237 A1    Jan. 19, 2017

(30) Foreign Application Priority Data
Mar. 12, 2014    (JP) .................................. 2014-048890

(51) Int. Cl.
*B60Q 1/14* (2006.01)
*B60Q 11/00* (2006.01)
*B60Q 1/18* (2006.01)

(52) U.S. Cl.
CPC ............. *B60Q 1/1423* (2013.01); *B60Q 1/18* (2013.01); *B60Q 11/00* (2013.01); *B60Q 11/005* (2013.01);
(Continued)

(58) Field of Classification Search
CPC .. B60Q 1/1423; B60Q 2300/052; B60Q 1/14; B60Q 1/1415; B60Q 11/00; B60Q 2300/054
(Continued)

(56) References Cited

U.S. PATENT DOCUMENTS

2001/0012206 A1    8/2001    Hayami et al.

FOREIGN PATENT DOCUMENTS

JP    H01-309836 A    12/1989
JP    04215538 A  *  8/1992
(Continued)

*Primary Examiner* — Isaac G Smith
(74) *Attorney, Agent, or Firm* — Knobbe, Martens, Olson & Bear, LLP

(57) ABSTRACT

A vehicle control system includes a first control apparatus that controls a first lamp mounted in a vehicle and a second control apparatus that controls a second lamp mounted in the vehicle. The first control apparatus starts light-on/off control of the first lamp under a condition that a light-on/off command is inputted, turns on/off the first lamp such that a light quantity of the first lamp is gradually changed over a first transition time from the start of light-on/off control to when the light quantity of the first lamp reaches a target and light-on/off is completed, and inputs an auxiliary light-on/off command to the second control apparatus. The second control apparatus starts light-on/off control of the second lamp under a condition that the auxiliary light-on/off command is inputted, and turns on/off the second lamp such that a light quantity of the second lamp is gradually changed over a second transition time from the start of light-on/off control to when the light quantity of the second lamp reaches a target and light-on/off is completed. The first transition time is longer than the second transition time by an amount of time corresponding to a time lag from the start of light-on/off control of the first lamp to the start of light-on/off control of the second lamp.

12 Claims, 8 Drawing Sheets

(52) U.S. Cl.
CPC .. *B60Q 2300/054* (2013.01); *B60Q 2300/314* (2013.01)

(58) Field of Classification Search
USPC .................................. 701/36; 362/459, 464
See application file for complete search history.

(56) References Cited

FOREIGN PATENT DOCUMENTS

| | | | |
|---|---|---|---|
| JP | H04-215538 A | | 8/1992 |
| JP | 2013-006580 A | | 1/2013 |
| JP | 2013006580 A | * | 1/2013 |

\* cited by examiner

VEHICLE LAMP CONTROL SYSTEM AND OPERATION METHOD THEREOF

CROSS-REFERENCE TO RELATED APPLICATION

This application is a U.S. National Phase Application under 35 U.S.C. 371 of International Application No. PCT/JP2015/056710 filed on Mar. 6, 2015 and published in Japanese as WO 2015/137258 A1 on Sep. 17, 2015. This application is based on and claims the benefit of priority from Japanese Patent Application No. 2014-048890, filed Mar. 12, 2014. The entire disclosures of all of the above applications are incorporated herein by reference.

TECHNICAL FIELD

The present invention relates to a vehicle control system and an operation method thereof.

BACKGROUND ART

Conventionally, a vehicle control system that controls a lamp mounted in a vehicle is known. For example, a system that performs light-distribution control of areas ahead of and to the sides of a vehicle by regulating switching on, switching off, and light quantity of a plurality of lamps based on a steering angle is known (refer to PTL 1).

In addition, as a vehicle control system, a system that controls a plurality of lamps with a single, common control apparatus, and a system that controls a plurality of lamps with an individual control apparatus for each lamp are also known.

CITATION LIST

Patent Literature

[PTL 1] JP-A-2001-213227

SUMMARY OF INVENTION

Technical Problem

A redundant-type system that includes an individual control apparatus for each lamp is more advantageous in terms of vehicle safety, compared to a system in which a plurality of lamps are controlled by a single, common control apparatus. That said, in the case of left and right headlights (headlamps), for example, these lamps should ordinarily be turned on/off simultaneously. However, in the system in which a plurality of lamps are controlled through use of an individual control apparatus for each lamp, the on/off timings tend to differ between lamps.

For example, in a system in which, of two electronic control units that control two lamps, one electronic control unit functions as a master unit and the other electronic control unit serves as a slave unit, and the slave unit controls the light-on/off of an associated lamp based on a command from the master unit, the light-on/off timings tend to differ as a result of factors such as the following.

That is, the light-on/off timings tend to differ as a result of time delay between a timing at which the master unit starts control of the light-on/off of the associated lamp and a timing at which the master unit inputs the command to the slave unit, time delay between when the command from the master unit is inputted and when the slave unit starts control of the light-on/off of the associated lamp based on the command, and the like. As the difference in the timings of light-on/off increases, the more likely it is that a user experiences discomfort.

The present invention has been achieved in light of such issues. An object of the present invention is to provide a technology that enables suppression of discomfort experienced by a user as a result of differences in light-on/off timings between lamps, in a system in which, of two control apparatus that control two lamps, one control apparatus turns on/off an associated lamp by receiving a command from the other control apparatus.

Solution to Problem

A vehicle control system of the present invention includes a first control apparatus and a second control apparatus. The first control apparatus controls a first lamp that is mounted in a vehicle. The second control apparatus controls a second lamp that is mounted in the vehicle.

The first control apparatus turns on/off the first lamp by starting light-on/off control of the first lamp under a condition that a light-on/off command is inputted. Meanwhile, the first control apparatus inputs an auxiliary light-on/off command to the second control apparatus. In light-on/off control of the first lamp, the first lamp is turned on/off such that a light quantity of the first lamp gradually changes. That is, in light-on control of the first lamp, the first lamp is turned on such that the light quantity of the first lamp gradually increases. In light-off control, the first lamp is turned off such that the light quantity of the first lamp gradually decreases.

Meanwhile, the second control apparatus turns on/off the second lamp by starting light-on/off control of the second lamp under a condition that the auxiliary light-on/off command is inputted from the first control apparatus. In light-on/off control of the second lamp, the second lamp is turned on/off such that a light quantity of the second lamp gradually changes. That is, in light-on control of the second lamp, the second lamp is turned on such that the light quantity of the second lamp gradually increases. In light-off control, the second lamp is turned off such that the light quantity of the second lamp gradually decreases.

In the vehicle control system, the first control apparatus and the second control apparatus operate such that a state transition time (first transition time) of the first lamp is longer than a state transition time (second transition time) of the second lamp by an amount of time corresponding to a time lag from the start of light-on/off control of the first lamp to the start of light-on/off control of the second lamp.

The first transition time is an amount of time from the start of light-on/off control of the first lamp to when the light quantity of the first lamp reaches a target and light-on/off is completed. The second transition time is an amount of time from the start of light-on/off control of the second lamp to when the light quantity of the second lamp reaches a target and light-on/off is completed.

In this way, in the vehicle control system of the present invention, the first lamp and the second lamp are controlled such that a timing at which the light quantity of the first lamp reaches the target and light-on/off is completed and a timing at which the light quantity of the second lamp reaches the target and light-on/off is completed substantially match.

Therefore, in the present invention, compared to the past in which these timings are not matched, a user experiencing a difference in light-on/off timings between lamps can be suppressed. The time lag leading to discomfort in the user can be suppressed. This system achieves particularly excellent effects in the case of a pair of lamps in which a first lamp and a second lamp are preferably turned on-off at the same time as each other, such as left and right headlights mounted in a vehicle.

Here, the first transition time and the second transition time may be prescribed as fixed values at a designing stage. However, at least either of the first transition time and the second transition time may be dynamically adjusted in at least either of the first control apparatus and the second control apparatus.

For example, the second control apparatus may be configured to set the second transition time based on at least either of a process delay time that is an amount of time from the input of the auxiliary light-on/off command to the start of light-on/off control of the second lamp and a command delay time that is an amount of time from the start of light-on/off control of the first lamp to the input of the auxiliary light-on/off command by the first control apparatus. For this configuration, the first control apparatus may be configured to input the command delay time that is the amount of time from the start of light-on/off control of the first lamp to the input of the auxiliary light-on/off command, to the second control apparatus.

As a result of this configuration, the second transition time can be set to an appropriate amount of time in relation to the first transition time, under various circumstances. User discomfort as a result of a difference in the light-on/off timings can be further suppressed.

In addition, the second control apparatus may be configured to have a plurality of control modes with differing second transition times. The second control apparatus may select one of the plurality of control modes and start light-on/off control of the second lamp in the selected control mode. Specifically, the second control apparatus may be configured to set the second transition time to be shorter than the first transition time by an amount of time corresponding to a time lag, by determining the control mode to be selected based on the command delay time and the process delay time. As a result of this configuration, adjustment of the second transition time to an appropriate amount of time can be performed with relative ease.

DESCRIPTION OF EMBODIMENTS

An example of the present invention will hereinafter be described with reference to the drawings. A vehicle control system 1 of the present example shown in FIG. 1 is a system that controls light-on/off (light-on/light-off) of headlights 10A and 10B that are mounted in a vehicle 3.

The control system 1 includes, as electronic control units (ECUs), a main headlight control apparatus 20, an auxiliary headlight control apparatus 30, and a body ECU 40. The main headlight control apparatus 20 controls the headlight 10A based on a light-on/off command (light-on command/light-off command) from the body ECU 40. The auxiliary headlight control apparatus 30 controls the headlight 10B based on an auxiliary light-on/off command (auxiliary light-on command/auxiliary light-off command) from the main headlight control apparatus 20.

Hereafter, the term "light-on/off" is used as a term indicating both light-on and light-off. The light-on/off command is used as a term indicating both a light-on command and a light-off command. The auxiliary light-on/off command is used as a term indicating both an auxiliary light-on command and an auxiliary light-off command.

Figure 1:
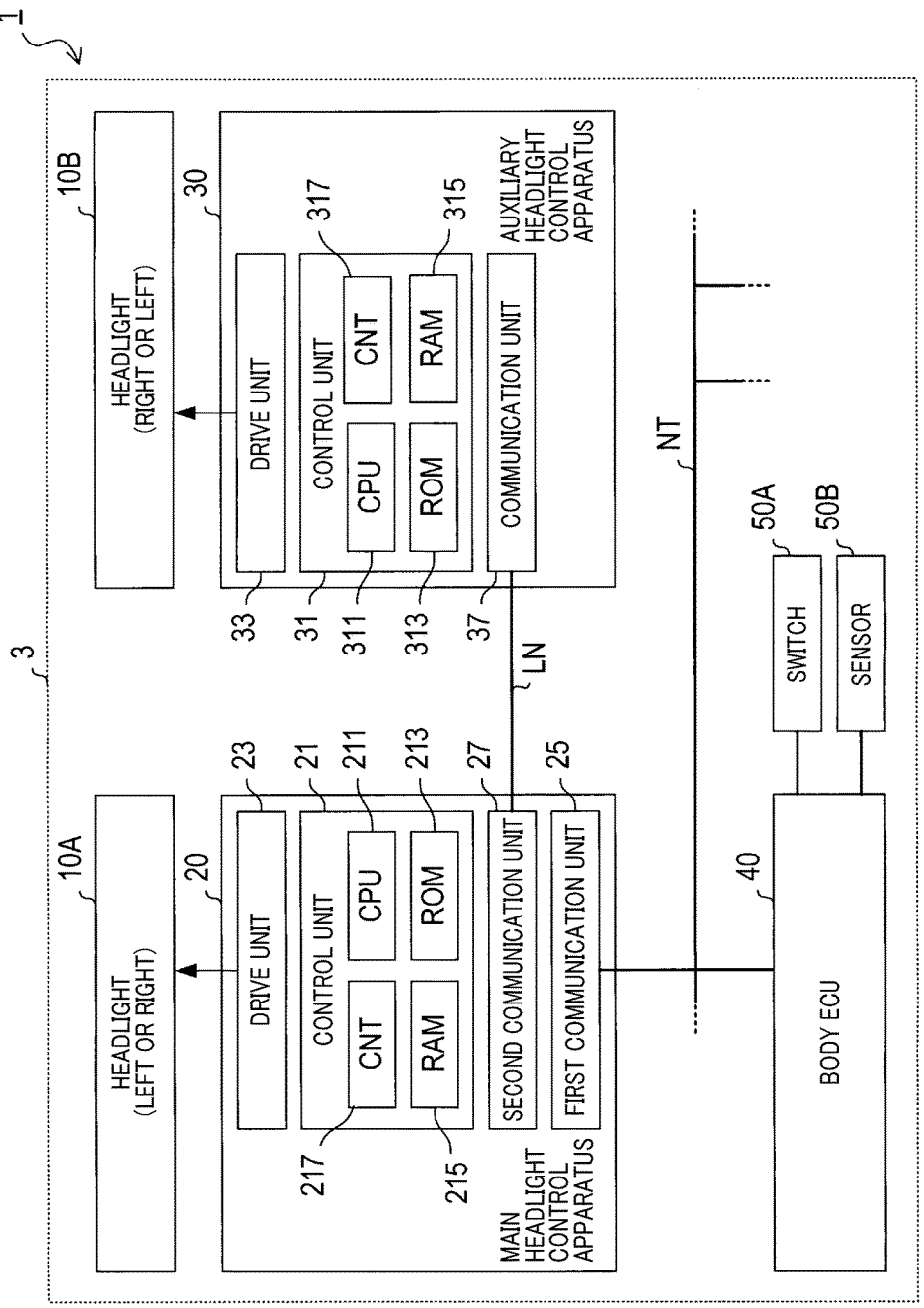
FIG. 1 is a block diagram of an overall configuration of a vehicle control system of an example.

In FIG. 1, the headlight 10A is shown on the left side. However, either of the headlights 10A and 10B may be the headlight installed on the left side of the vehicle, or the headlight installed on the right side of the vehicle. In the present specification, the headlight 10A controlled by the main headlight control apparatus 20 is also expressed as a main headlight 10A. The headlight 10B controlled by the auxiliary headlight control apparatus 30 is also expressed as an auxiliary headlight 10B. For example, the left and right headlights 10A and 10B are configured as light-emitting diode (LED) lamps.

As shown in FIG. 1, the main headlight control apparatus 20 includes a control unit 21, a drive unit 23, a first communication unit 25, and a second communication unit 27. The control unit 21 is configured as a microcomputer that performs integrated control of each section of the main headlight control apparatus 20. The control unit 21 includes a central processing unit (CPU) 211, a read-only memory (ROM) 213, a random access memory (RAM) 215, and a counter 217.

The CPU 211 performs various processes based on programs recorded in the ROM 213. The RAM 215 is used as a work area when the CPU 211 performs a process. The counter 217 provides a clocking function. Hereafter, the various processes performed by the CPU 211 based on the programs are described with the control unit 21 as the main operating component.

The drive unit 23 turns on/off the main headlight 10A based on a control signal from the control unit 21. Specifically, the drive unit 23 provides a light adjustment function. The drive unit 23 is configured to be capable of adjusting a light quantity (illuminance) of the main headlight 10A over a range from zero to 100%, which coincides with a standard light quantity, by changing a current applied to the main headlight 10A based on the control signal.

The first communication unit 25 is connected to an on-board network NT that is connected to the body ECU 40. The first communication unit 25 is configured to be capable of communicating with each node on the on-board network NT, including the body ECU 40.

For example, the on-board network NT is configured as a controller area network (CAN). In this case, the first communication unit 25 is connected to the body ECU 40 via a CAN bus. For example, the first communication unit 25 inputs a light-on/off command from the body ECU 40 to the control unit 21.

The second communication unit 27 is a communication interface capable of communicating with the auxiliary headlight control apparatus 30. The second communication unit 27 is connected to the auxiliary headlight control apparatus 30 by a communication line LN separate from the on-board network NT.

For example, the second communication unit 27 is configured to be capable of communicating with the auxiliary headlight control apparatus 30 via a local interconnect network (LIN) that serves as a subnetwork of the on-board network NT. The communication line LN in this case is an LIN bus. For example, the second communication unit 27 inputs an auxiliary light-on/off command from the control unit 21 to the auxiliary headlight control apparatus 30, via the communication line LN.

Meanwhile, the auxiliary headlight control apparatus 30 includes a control unit 31, a drive unit 33, and a communication unit 37. In a manner similar to the control unit 21, the control unit 31 is configured as a microcomputer that performs integrated control of each section of the auxiliary headlight control apparatus 30. The control unit 31 includes a CPU 311, a ROM 313, and a RAM 315, and a counter 317. Hereafter, various processes performed by the CPU 311 based on programs recorded in the ROM 313 are described with the control unit 31 as the main operating component.

The drive unit 33 turns on/off the auxiliary headlight 10B based on a control signal from the control unit 31. In a manner similar to the drive unit 23, the drive unit 33 provides a light adjustment function. The drive unit 33 is configured to be capable of adjusting a light quantity (illuminance) of the auxiliary headlight 10B over a range from zero to 100%, which coincides with a standard light quantity, by changing a current applied to the auxiliary headlight 10B based on the control signal. For example, the headlights 10A and 10B are configured as lamps having the same standard light quantity.

The communication unit 37 is configured to be capable of communicating with the main headlight control apparatus 20. The communication unit 37 is connected to the second communication unit 27 provided in the main headlight control apparatus 30, via the communication line LN. For example, the communication unit 37 transmits the auxiliary light-on/off command from the main headlight control apparatus 20 to the control unit 31.

In addition, the body ECU 40 is an electronic control unit that manages body-system equipment, such as door locks, lamps, and power windows. The body ECU 40 manages operations of body-system equipment by inputting commands, via the on-board network NT, to electronic control units substantially controlling the body-system equipment.

For example, the body ECU 40 manages the light-on/off of the headlights 10A and 10B by inputting the light-on/off command to the main headlight control apparatus 20, via the on-board network NT. A switch 50A that is operable by a vehicle passenger and a sensor 50B that is capable of detecting brightness outside of the vehicle are connected to the body ECU 40. The body ECU 40 inputs the light-on/off command to the main headlight control apparatus 20 based on an operating signal from the switch 50 or a detection signal from the sensor 50B.

Figure 2:
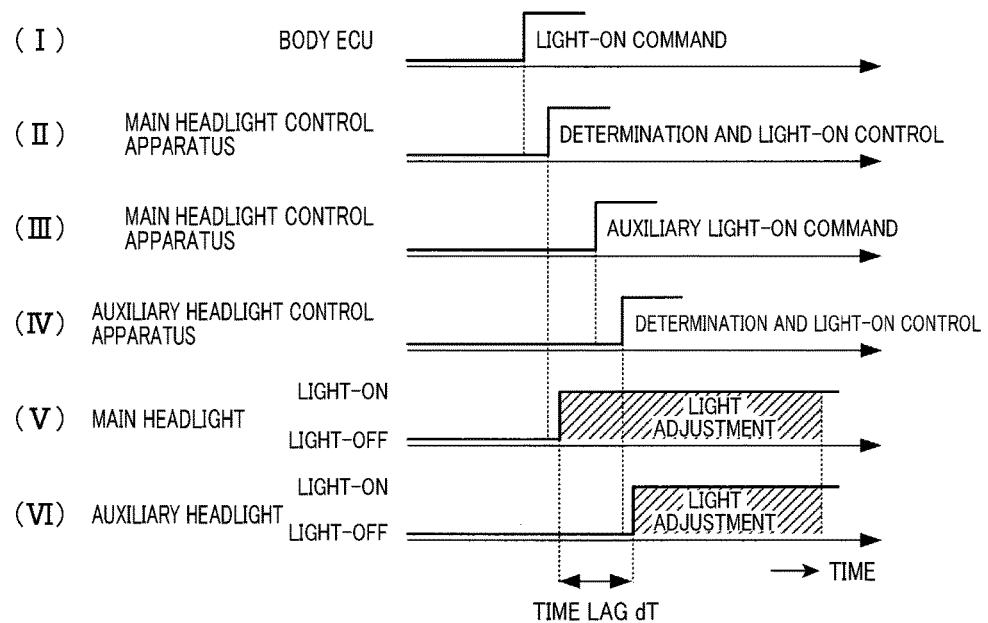
FIG. 2 is a time chart showing occurrence timings of various events in the vehicle control system shown in FIG. 1.

Here, characteristics provided in the vehicle control system 1 will be simply described with reference to FIG. 2 and FIG. 3. FIG. 2 conceptually shows occurrence timings of various events. A first row (I) in FIG. 2 shows the occurrence timing of the light-on command from the body ECU 40. In FIG. 2, the timing is conceptually indicated in the form of a rising edge of a rectangular signal. The first row can also be said to indicate a reception timing of the light-on command by the first communication unit 25 of the main headlight control apparatus 20.

A second row (II) in FIG. 2 indicates an execution timing of a determination process performed by the control unit 21 of the main headlight control apparatus 20. The determination process includes a step of determining whether or not the light-on command is received. For example, the determination process is periodically performed. After determining that the light-on command is received in the determination process, the control unit 21 starts light-on control of the main headlight 10A. In this way, the control unit 21 starts light-on control of the main headlight 10A with a delay after the first communication unit 25 receives the light-on command.

A fifth row (V) in FIG. 2 indicates a light-on start timing of the main headlight 10A by light-on control. As a result of the start of light-on control, the light quantity of the main headlight 10A gradually increases from zero to 100%. A shaded area in the fifth row indicates a light-on progression of the light quantity of the main headlight 10A from zero until the target 100% is reached. A right end of the shaded area indicates a light-on completion timing at which the light quantity of the main headlight 10A reaches 100%.

In addition, a third row (III) in FIG. 2 indicates a timing at which the second communication unit 27 of the main headlight control apparatus 20 transmits the auxiliary light-on command. The auxiliary light-on command is transmitted after the light-on command is determined to be received in the determination process. In other words, the third row can also be said to indicate a reception timing of the auxiliary light-on command by the communication unit 37 of the auxiliary headlight control apparatus 30.

The fourth row (IV) in FIG. 2 indicates an execution timing of a determination process performed by the control unit 31 of the auxiliary headlight control apparatus 30. The determination process includes a step of determining whether or not the auxiliary light-on command is received. For example, the determination process is periodically performed. When determined that the auxiliary light-on command is received in the determination process, the control unit 31 starts light-on control of the auxiliary headlight 10B. In this way, the control unit 31 starts light-on control of the auxiliary headlight 10B with a delay after the communication unit 27 receives the auxiliary light-on command.

A sixth row (VI) in FIG. 2 indicates a light-on start timing of the auxiliary headlight 10B by light-on control. As a result of the start of light-on control, the light quantity of the auxiliary headlight 10B gradually increases from zero to 100%. A shaded area in the sixth row indicates a light-on progression of the light quantity of the auxiliary headlight 10B from zero until the target 100% is reached. A right end of the shaded area indicates a light-on completion timing at which the light quantity of the auxiliary headlight 10B reaches 100%.

Based on the example shown in FIG. 2, a time lag amounting to time dT is present between the start timing of a light-on control of the main headlight 10A and the start timing of light-on control of the auxiliary headlight 10B. Conversely, the light-on completion timing of the auxiliary headlight 10B substantially matches the light-on completion timing of the main headlight 10A, regardless of the time lag.

Figure 3:
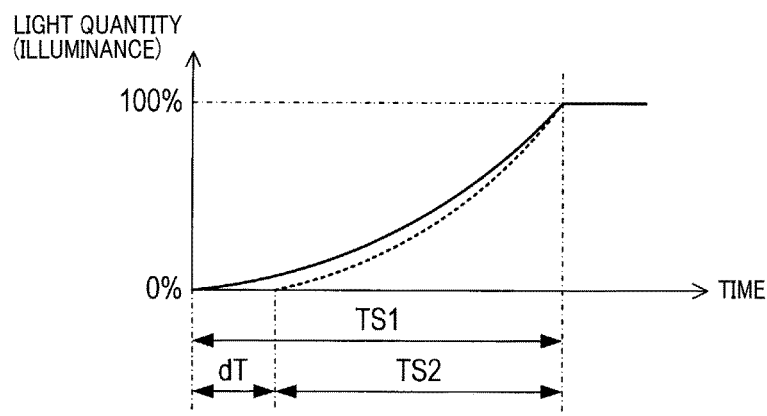
FIG. 3 is a graph showing changes in light quantity of left and right headlights shown in FIG. 1.

As shown in FIG. 3, the main headlight control apparatus 20 of the present example performs light-on control of the main headlight 10A so as to gradually change the light quantity of the main headlight 10A from zero to 100%, over time TS1 from the start of light-on control (see solid line in FIG. 3). Meanwhile, the auxiliary headlight control apparatus 30 performs light-on control of the auxiliary headlight 10B so as to gradually change the light quantity of the auxiliary headlight 10B from zero to 100%, over time TS2 that is shorter than time TS1 by an amount of time corresponding to the time lag dT, from the start of light-on control (see broken line in FIG. 3). As a result of these light-on controls, both light-on completion timings substantially match.

The solid line in FIG. 3 indicates an overview of the changes in light quantity of the main headlight 10A. The broken line indicates an overview of the changes in light quantity of the auxiliary headlight 10B. In FIG. 3, the light quantities of the main headlight 10A and the auxiliary headlight 10B are adjusted such that the timings at which the light quantities reach 100% match. The changes in light quantity shown in FIG. 3 are nonlinear. However, the light quantity may be adjusted to change in a linear manner (based on a linear function).

Should time TS1 and TS2 be set to match, the difference in light-on timings between the headlights 10A and 10B becomes prominent, thereby possibly causing the user discomfort. In the present example, light adjustment times TS1 and TS2 over which the light quantities are changed from zero to 100% are set to differ, between the headlights 10A and 10B, by an amount of time corresponding to the time lag dT, as described above. As a result, the light-on completion timings between the headlights 10A and 10B are matched, and discomfort in the user is suppressed.

Figure 4:
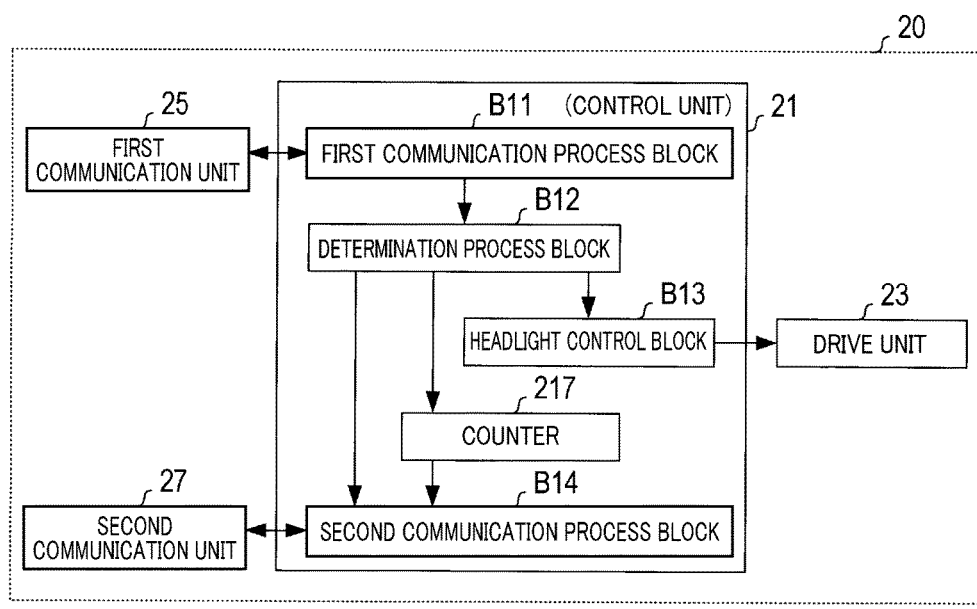
FIG. 4 is a functional block diagram of a control unit provided in a main headlight control apparatus shown in FIG. 1.

Next, a detailed configuration of the control unit 21 provided in the main headlight control apparatus 20 will be described. As shown in FIG. 4, the control unit 21 functions as a first communication process block B11, a determination process block B12, a headlight control block B13, and a second communication process block B14, as a result of the CPU 211 running programs.

The first communication process block B11 is a process block involved with communication with a node (body ECU 40) on the on-board network NT using the first communication unit 25. When the light-on/off command is received from the body ECU 40, the first communication process block stores the light-on/off command in a buffer (RAM 215).

When the light-on/off command is received, the determination process block B12 instructs the headlight control block B13 to start light-on/off control, while instructing the second communication process block B14 to transmit the auxiliary light-on/off command.

When instructed to start light-on/off control, the headlight control block B13 performs light-on/off control the main headlight 10A through the drive unit 23. Here, as light-on control corresponding to the light-on command, the headlight control block B13 performs a process in which the light quantity of the main headlight 10A is increased from zero to 100% over a predetermined light-adjustment time TS1. Meanwhile, as light-off control corresponding to the light-off command, the headlight control block B13 performs a process in which the light quantity of the main headlight 10A is decreased from 100% to zero over the predetermined light-adjustment time TS1.

In addition, the second communication process block B14 is a process block involved with communication with the auxiliary headlight control apparatus 30 using the second communication unit 27. When instructed by the determination process block B12 to transmit the auxiliary light-on/off command, the second communication process block B14 transmits the auxiliary light-on/off command, for which the instruction is issued, to the auxiliary headlight control apparatus 30 via the second communication unit 27.

Figure 5:
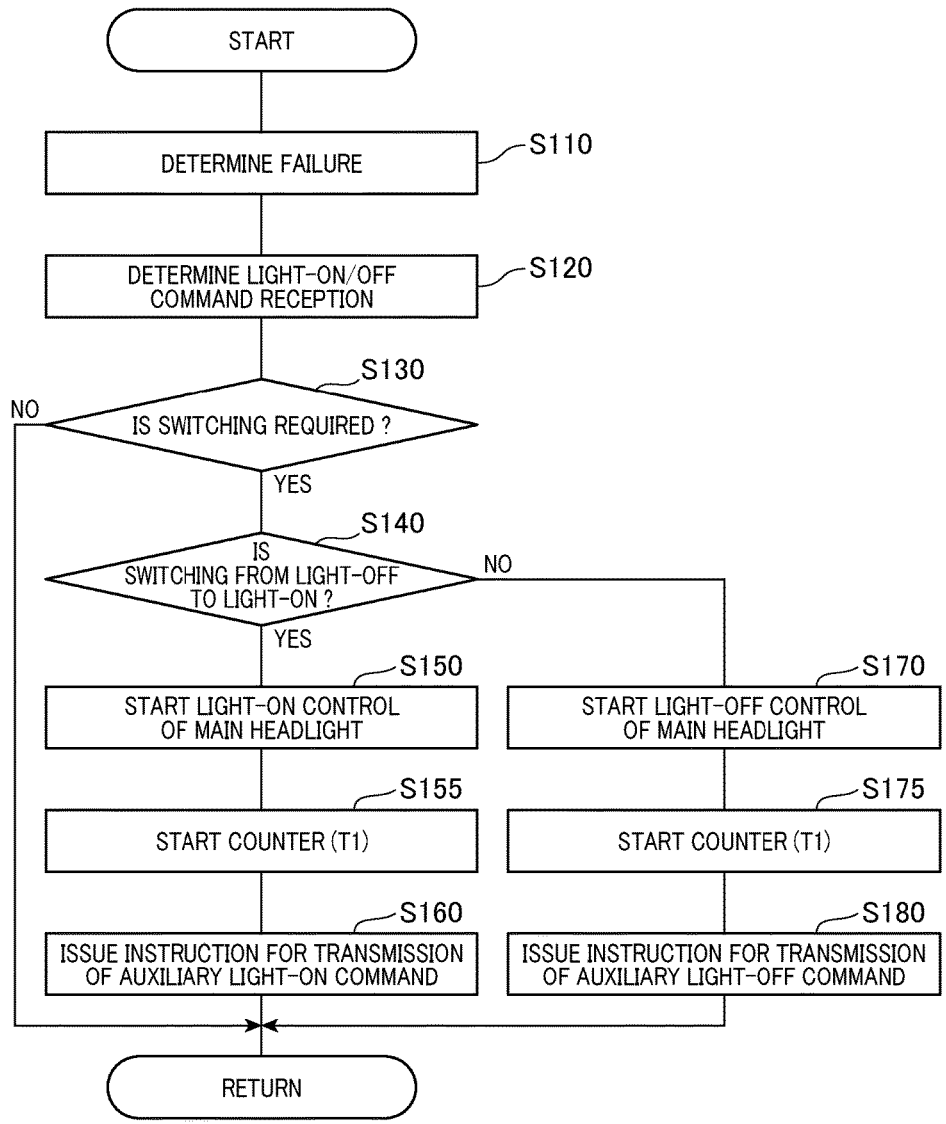
FIG. 5 is a flowchart of a determination process performed by the control unit of the main headlight control apparatus shown in FIG. 4.

Specifically, the control unit 21 actualizes a function as the determination process block B12 by repeatedly performing a determination process shown in FIG. 5 at a predetermined cycle. In this determination process, the control unit 21 determines whether or not a failure related to the main headlight 10A has occurred. For example, the control unit 21 determines whether or not a failure, such as disconnection, has occurred by referencing a state of a signal line between the main headlight 10A and the drive unit 23 (step S110).

Furthermore, the control unit 21 determines whether or not either of the light-on command and the light-off command is received by referencing the buffer (step S120). Subsequently, the control unit 21 determines whether or not switching of the state of the main headlight 10A is required (step S130).

When determined at S120 that either of the light-on command and the light-off command is received, at S130, the control unit 21 determines whether or not light-on/off of the main headlight 10A based on the command is required to be performed. When the light-on command/light-off command is received in a state in which the main headlight 10A is turned off/on, the control unit 21 determines that switching is required. When the light-on command/light-off command is received in a state in which the main headlight 10A is turned on/off, the control unit 21 determines that switching is not required. Meanwhile, when neither of the light-on command and the light-off command is received, the control unit 21 determines that switching is not required.

When determined that switching is not required (No at step S130), the control unit 21 ends the determination process shown in FIG. 5. Meanwhile, when determined that switching is required (Yes at step S130), the control unit 21 determines the type of switching (step S140).

Then, when determined that the switching is from light-off to light-on (Yes at step S140), the control unit 21 instructs the headlight control block B13 to start light-on control of the main headlight 10A (step S150). As a result of this instruction, the main headlight 10A is controlled such that the light quantity thereof gradually increases from zero to the target 100% (see the solid line in FIG. 3). Light-on is completed after the predetermined light-adjustment time TS1. The "light-on completion" herein refers to the light quantity reaching 100% and the light-on progression being completed.

While issuing an instruction for the start of such light-on control, the control unit 21 makes the counter 217 start a clocking operation (step S155). As a result, the counter 217 is made to clock an elapsed time T1 from the start of light-on control. Furthermore, the control unit 21 instructs the second communication process block B14 to transmit the auxiliary light-on command (step S160). Subsequently, the control unit 21 ends the determination process.

Meanwhile, when determined at step S140 that the switching from light-on to light-off (No at step S140), the control unit 21 proceeds to step S170 and instructs the headlight control block B13 to start the light-off control of the main headlight 10A. As a result of this instruction, the main headlight 10A is controlled such that the light quantity thereof gradually decreases from 100% to the target zero. Light-off is completed after the predetermined light-adjustment time TS1. The "light-off completion" herein refers to the light quantity reaching zero and the light-off progression being completed.

While issuing an instruction for the start of such light-off control, the control unit 21 starts the clocking operation by the counter 217 (step S175). That is, the control unit 21 makes the counter 217 clock the elapsed time T1 from the start of light-off control. Furthermore, the control unit 21 instructs the second communication process block B14 to transmit the auxiliary light-off command (step S180). Subsequently, the control unit 21 ends the determination process.

Figure 6:
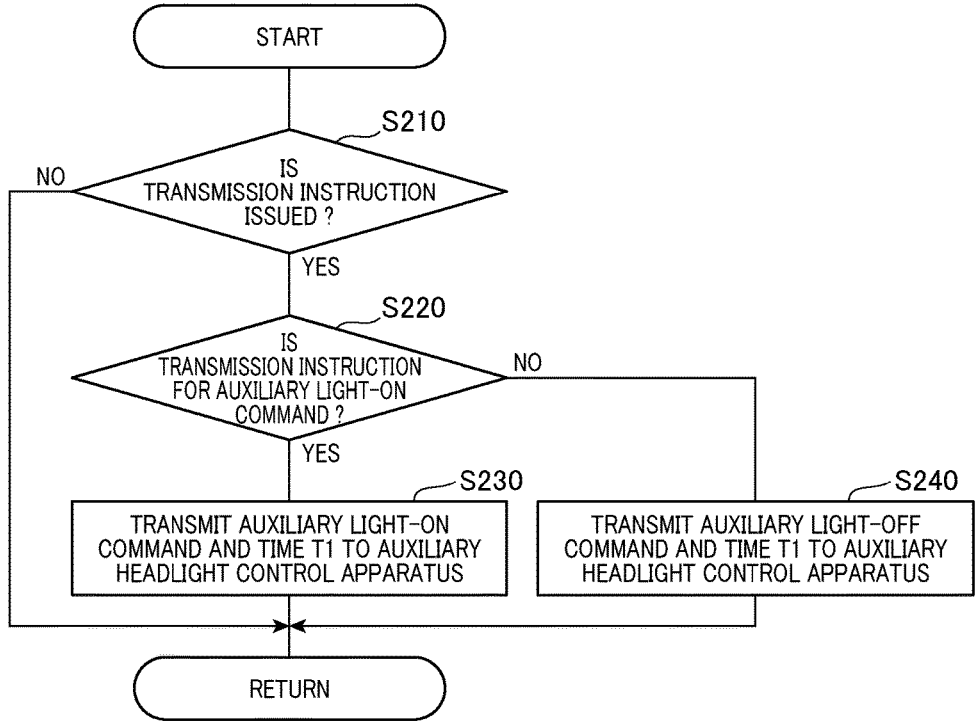
FIG. 6 is a flowchart of a transmission process performed by the control unit of the main headlight control apparatus shown in FIG. 4.

Meanwhile, the control unit 21 actualizes a function of the second communication process block B14 by repeatedly performing a transmission process shown in FIG. 6 at a predetermined cycle. In this transmission process, the control unit 21 determines whether or not a transmission instruction is issued (step S210). When determined that the transmission instruction is not issued (No at step S210), the control unit 21 ends the transmission process.

Meanwhile, when determined that the transmission instruction is issued (Yes at step S210), the control unit 21 determines the type of the transmission instruction (step S220). When determined that the transmission instruction is the transmission instruction for the auxiliary light-on command (Yes at step S220), the control unit 21 stops the clocking of the counter 217 and acquires the elapsed time T1 up to the current point from the counter 217. The control unit 21 then transmits the auxiliary light-on command, together with the information on the elapsed time T1, to the auxiliary headlight control apparatus 30 via the second communication unit 27 (step S230). Subsequently, the control unit 21 ends the transmission process.

Figure 7:
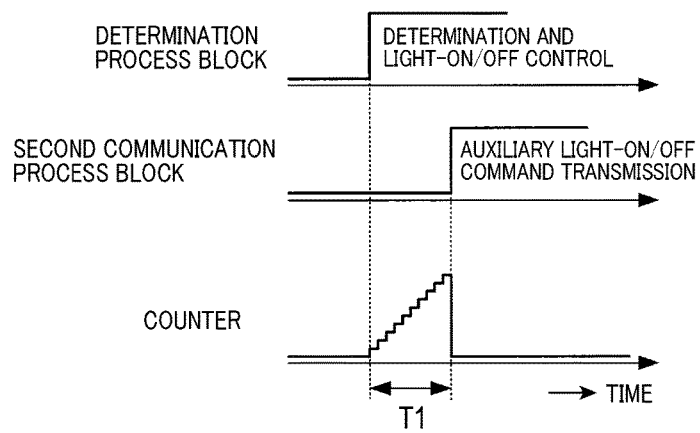
FIG. 7 is a diagram for explaining a timing operation of a counter in the main headlight control apparatus shown in FIG. 4.

As shown in FIG. 7, the elapsed time T1 transmitted herein corresponds to a command delay time that is an amount of time from the start of light-on control of the main headlight 10A to the transmission timing of the auxiliary light-on command (in other words, the input timing of the auxiliary light-on command to the auxiliary headlight control apparatus 30).

FIG. 7 indicates that timing by the counter 217 is performed over a period corresponding to the difference between an execution timing of the determination process that is periodically performed and an execution timing of the transmission process that is periodically performed, and the elapsed time T1 is thereby measured.

Meanwhile, when determined that the transmission instruction is the transmission instruction for the auxiliary light-off command (No at step S220), the control unit 21 similarly stops the clocking of the counter 217 and acquires the elapsed time T1 up to the current point from the counter 217. The control unit 21 then transmits the auxiliary light-off command, together with the information on the elapsed time T1, to the auxiliary headlight control apparatus 30 via the second communication unit 27 (step S240). Subsequently, the control unit 21 ends the transmission process.

Figure 8:
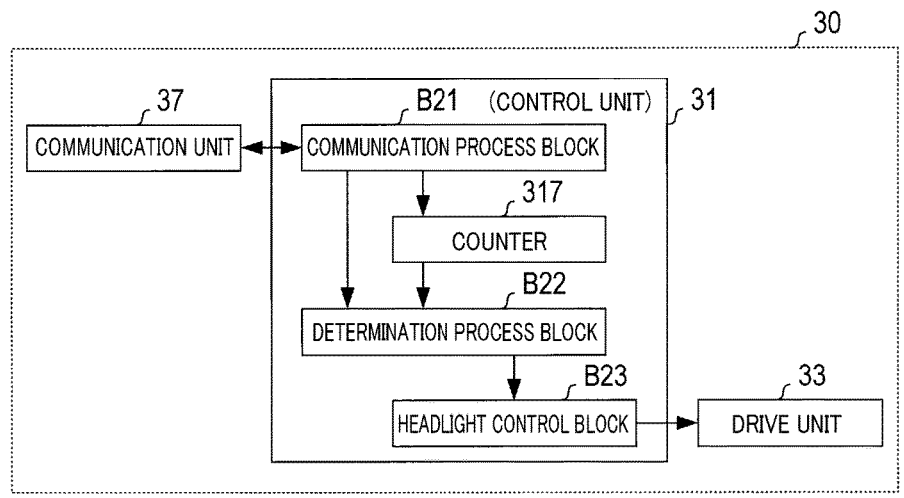
FIG. 8 is a functional block diagram of a control unit provided in an auxiliary headlight control apparatus shown in FIG. 1.

In addition, the control unit 31 of the auxiliary headlight control apparatus 30 is configured as shown in FIG. 8. That is, the control unit 31 functions as a communication process block B21, a determination process block B22, and a headlight control block B23 as a result of the CPU 311 running programs.

Figure 9:
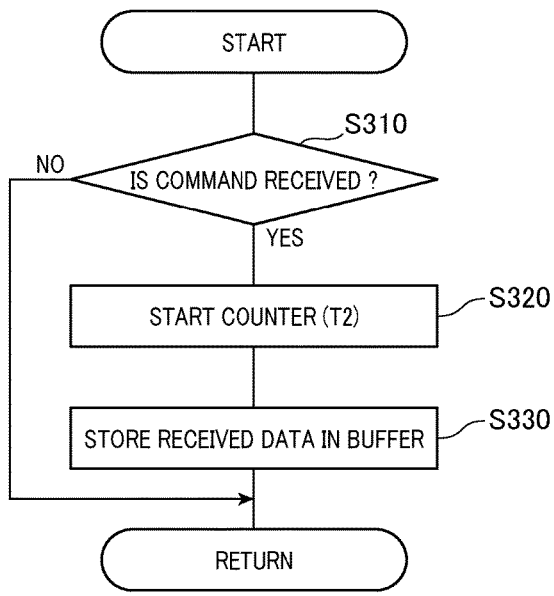
FIG. 9 is a flowchart of a reception process performed by the control unit of the auxiliary headlight control apparatus shown in FIG. 8.

The communication process block B21 is a process block involved with communication with the main headlight control apparatus 20 using the communication unit 37. The control unit 31 actualizes a function of the communication process block B21 by performing a reception process shown in FIG. 9. For example, the reception process is performed based on an interrupt signal from the communication unit 37, or is periodically performed.

In this reception process, when reception of the auxiliary light-on/off command by the communication unit 37 is detected (Yes at S310), the control unit 31 makes the counter 317 start a clocking operation. That is, the counter 317 is made to measure an elapsed time T2 from the reception of the auxiliary light-on/off command. Furthermore, the control unit 31 stores the received auxiliary light-on/off command and the information on the elapsed time T1 in a buffer (RAM 315) (step S330). Subsequently, the control unit 31 ends the reception process. Meanwhile, when reception of the auxiliary light-on/off command is not detected (No at S310), the control unit 31 ends the reception process without performing any substantial processing.

The determination process block B22 (see FIG. 8) is a process block that instructs the headlight control block B23 to start light-on/off control when the auxiliary light-on/off command is received. When instructed to start light-on/off control, the headlight control block B23 performs light-on/off control of the auxiliary headlight 10B through the drive unit 33. Here, as light-on control corresponding to the auxiliary light-on command, the headlight control block B23 performs a process in which the light quantity of the auxiliary headlight 10B is increased from zero to 100% over a predetermined light-adjustment time TS2. Meanwhile, as light-off control corresponding to the auxiliary light-off command, the headlight control block B23 performs a process in which the light quantity of the auxiliary headlight 10B is decreased from 100% to zero over the predetermined light-adjustment time TS2.

However, the headlight control block 23 has a plurality of control modes with differing light adjustment times TS2. The headlight control block 23 is configured to select a control mode designated by the determination process block B22, among the plurality of control modes, and perform light-on/off control of the auxiliary headlight 10B in the selected control mode.

Specifically, the headlight control block B23 has first, second, and third controls modes. Among a light adjustment time TS2[1] in the first control mode, a light adjustment time TS2[2] in the second control mode, and a light adjustment time TS2[3] in the third control mode, an inequality TS2[1]>TS2[2]>TS2[3] is established. For example, the light adjustment times TS2[1], TS2[2], and TS2[3] are prescribed with reference to a variation range of the above-described time lag dT at a designing stage of the vehicle control system 1.

For example, when a variation range of time Y=(TS1−dT) is Ymin<Y<Ymax, each of the light adjustment times TS2[1], TS2[2], and TS2[3] and thresholds Y1 and Y2 can be prescribed to be a value corresponding to a boundary of each area delimiting the variation range into six equal parts, such that an inequality Ymax>TS2[1]<Y1>TS2[2]>Y2>TS2[3]>Ymin is satisfied. The thresholds Y1 and Y2 will be described hereafter.

Next, a determination process shown in FIG. 10 will be described. The control unit 31 actualizes a function as the determination process block B22 by repeatedly performing this determination process at a predetermined cycle.

In this determination process, by a technique similar to that at S110, the control unit 31 determines whether or not a failure related to the auxiliary headlight 10B has occurred (S410). Furthermore, the control unit 31 determines whether or not either of the auxiliary light-on command and the auxiliary light-off command is received by referencing the buffer (step S420).

Subsequently, the control unit 31 determines whether or not switching of the state of the auxiliary headlight 10B is required (step S430). That is, when determined at S420 that either of the auxiliary light-on command and the auxiliary light-off command is received, by a technique similar to that at step S130, the control unit 31 determines whether or not switching from light-on to light-off or light-off to light-on of the auxiliary headlight 10B based on the command is required to be performed. Meanwhile, when neither of the auxiliary light-on command and the auxiliary light-off command is received, the control unit 31 determines that switching is not required.

Figure 10:
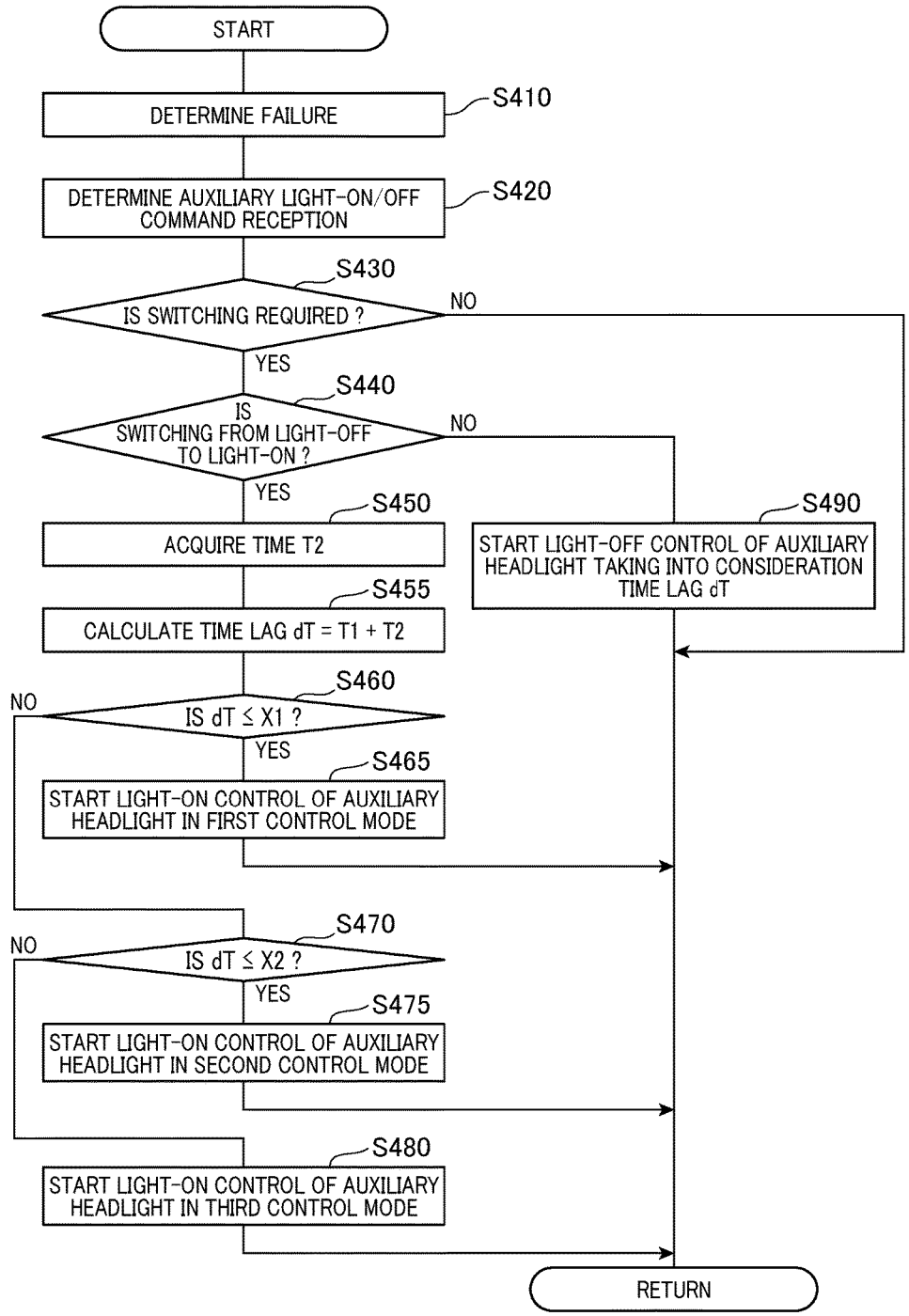
FIG. 10 is a flowchart of a determination process performed by the control unit of the auxiliary headlight control apparatus shown in FIG. 8.

When determined that switching is not required (No at step S430), the control unit 31 ends the determination process shown in FIG. 10. Meanwhile, when determined that switching is required (Yes at step S430), the control unit 31 determines the type of switching (step S440).

Figure 11:
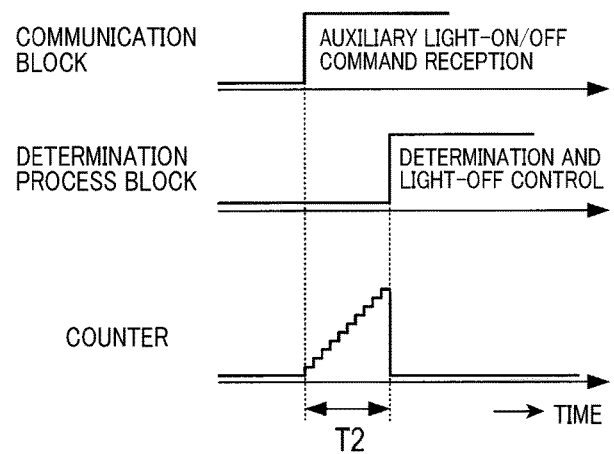
FIG. 11 is a diagram for explaining a timing operation of a counter in the auxiliary headlight control apparatus shown in FIG. 8.

When determined that the switching is from light-off to light-on (Yes at step S440), the control unit 31 proceeds to step S450. The control unit 31 stops the clocking of the counter 317 and acquires the elapsed time T2 up to the current point from the counter 317. As shown in FIG. 11, the elapsed time T2 corresponds to a process delay time from the reception of the auxiliary light-on command to the start of light-on control of the auxiliary headlight 10B. FIG. 11 indicates that clocking by the counter 317 is performed over a period from the reception of the auxiliary light-on/off command to the execution timing of the determination process that is periodically performed, and the elapsed time T2 is thereby measured.

Subsequently, the control unit 31 proceeds to step S455. The control unit 31 calculates the time lag dT between the start timing of light-on control of the main headlight 10A and the start timing of light-on control of the auxiliary headlight 10B, based on the information on the elapsed time T1 received from the main headlight control apparatus 20 and the information on the elapsed time T2 acquired from the counter 317. Specifically, the control unit 31 calculates the time lag dT as an additional value (T1+T2) of the elapsed time T1 and the elapsed time T2.

Then, the control unit 31 determines whether or not the calculated time lag dT is a threshold X1 or less (step S460). When determined that the time lag dT is the threshold X1 or less (Yes at step S460), the control unit 31 instructs the headlight control block B23 to start light-on control of the auxiliary headlight 10B in the first control mode (step S465). The threshold X1 can be prescribed as a value X1=(TS1−Y1) using the above-described threshold Y1.

When the time lag dT is the threshold X1 or less, an appropriate value of the light adjustment time TS2 for matching the light-on completion timings of the headlights 10A and 10B can be understood to be a value Y1=(TS1−X1) or greater. Meanwhile, the light adjustment time TS2[1] in the first control mode is between the value Y1 and an appropriate value Ymax of the light adjustment time TS2 when the time lag dT is an assumed minimum value Xmin=TS1−Ymax.

Therefore, when the headlight control block B23 starts light-on control of the auxiliary headlight 10B in the first control mode based on the instruction, the light quantity of the auxiliary headlight 10B is changed (see the broken line in FIG. 3) so that the light-on completion timing thereof substantially matches the light-on completion timing of the main headlight 10A, and light-on is completed after the predetermined light adjustment time TS2[1].

Meanwhile, when determined that the time lag dT is greater than the threshold X1 (No at step S460), the control unit 31 determines whether or not the time lag dT is a threshold X2 or less (step S470). When determined that the time lag dT is the threshold X2 or less (Yes at step S470), the control unit 31 instructs the headlight control block B23 to start light-on control of the auxiliary headlight 10B in the second control mode (step S475). The threshold X2 can be prescribed as a value X2=(TS1−Y2) using the above-described threshold Y2.

When the time lag dT is X1<dT<X2, the appropriate value of the light adjustment time TS2 for matching the light-on completion timings of the headlights 10A and 10B can be understood to be the value Y2 or greater and less than the value Y1. Meanwhile, the light adjustment time TS2[2] in the second control mode is between the value Y1 and the value Y2.

Therefore, when the headlight control block B23 starts light-on control of the auxiliary headlight 10B in the second control mode based on the instruction, the light quantity of the auxiliary headlight 10B is changed so that the light-on completion timing thereof substantially matches the light-on completion timing of the main headlight 10A, and light-on is completed after the predetermined light adjustment time TS2[2].

In addition, when determined that the time lag dT is greater than the threshold X2 (No at step S470), the control unit 31 instructs the headlight control block B23 to start light-on control of the auxiliary headlight 10B in the third control mode (step S480).

When the time lag dT is dt>X2, the appropriate value of the light adjustment time TS2 for matching the light-on completion timings of the headlights 10A and 10B can be understood to be less than the value Y2. Meanwhile, the light adjustment time TS2[3] in the third control mode is between the value Y2 and the value Ymin.

Therefore, when the headlight control block B23 starts light-on control of the auxiliary headlight 10B in the third control mode based on the instruction, the light quantity of the auxiliary headlight 10B is changed so that the light-on completion timing thereof substantially matches the light-on completion timing of the main headlight 10A, and light-on is completed after the predetermined light adjustment time TS2[3].

In this way, when the auxiliary light-on command is inputted, the control unit 31 designates a control mode based on the measured time lag dT and makes the headlight control block B23 start light-on control of the auxiliary headlight 10B. As a result, the control unit 31 turns on the auxiliary headlight 10B such that the light-on completion timings of the headlights 10A and 10B match, even with variations in the time lag dT. Subsequently, the control unit 31 ends the determination process.

In addition, when the auxiliary light-off command is inputted from the main headlight control apparatus 20 (No at step S440), the control unit 31 proceeds to step S490. The control unit 31 designates the control mode based on the time lag dT, and instructs the headlight control block B23 to start light-off control. The method for selecting the control mode can be performed in a manner similar to the processes at step S450 to step S480.

Upon receiving this instruction, the headlight control block B23 performs light-off control of the auxiliary headlight 10B through the drive unit 33. Here, the headlight control block B23 performs a process to reduce the light quantity of the auxiliary headlight 10B from 100% to zero over the light adjustment time TS2[1], TS2[2], or TS2[3] corresponding to the control mode. As a result, the auxiliary headlight 10B is turned off so that the light-off completion timings of the headlights 10A and 10B substantially match. Subsequently, the determination process is ended.

The vehicle control system 1 of the present example is described above. In the present example, in the system in which the main headlight control apparatus 20 controls light-on/off of the headlight 10A based on the light-on/off command from the body ECU 40 and the auxiliary headlight control apparatus 30 controls light-on/off of the headlight 10B based on the auxiliary light-on/off command from the main headlight control apparatus 20, discomfort experienced by a user as a result of a difference in the light-on/off timings between the headlights 10A and 10B is suppressed.

Specifically, as a mode of light-on/off control, a control mode is selected based on the time lag dT from the start of light-on/off control of the headlight 10A to the start of light-on/off control of the headlight 10B. As a result, the light adjustment time TS2 from the start of light-on/off control of the headlight 10B to when the light quantity of the headlight 10B reaches the target (100% or zero) and light-off is completed is set to be shorter than the light adjustment time TS1 of the headlight 10A by an amount of time corresponding to the time lag dT. The light-on/off completion timings of the headlights 10A and 10B are thereby matched.

Therefore, in the vehicle control system 1 of the present example, individual control apparatuses 20 and 30 are respectively provided for the left and right headlights 10A and 10B. A redundant system that is advantageous in terms of vehicle safety is configured. Meanwhile, light-on/off of the headlights 10A and 10B can be favorably performed while suppressing uneasiness and discomfort experienced by the user. That is, in the present example, the vehicle control system 1 that is a control system more resistant towards failure and the like and advantageous in terms of vehicle safety, compared to when a common control apparatus is provided for the left and right headlights 10A and 10B, and is capable of suppressing discomfort experienced by the user as a result of a difference in the light-on/off timings can be configured.

Here, the present invention is not limited to the above-described example. Various aspects are also possible. For example, in the above-described example, the light adjustment time appropriate for the measured time lag dT is selected from the plurality of discretely provided light adjustment times TS2[1], TS2[2], and TS2[3]. Light-on/off control of the headlight 10B is then performed.

However, instead of the above-described steps S460 to S480 and S490, a following process can be performed. That is, the control unit 31 can designate TS2=TS1−dT as the light adjustment time TS2, based on the time lag dT, to the headlight control block B23, and make the headlight control block B23 start light-on/off control. Meanwhile, the headlight control block B23 can perform light-on/off control so as to gradually change the light quantity of the headlight 10B to the target (100% or zero) over the designated light adjustment time TS2. In this case, the light-on/off completion times of the headlights 10A and 10B can be matched with further accuracy.

However, according to an embodiment in which the above-described control modes are used, all that is required is that the headlight control block B23 perform an operation to control the current applied to the headlight 10B in a pattern determined in advance for each control mode. An advantage is that adjustment of the light-on/off timings can be performed with relative ease.

In addition, the auxiliary headlight control apparatus 30 may be configured to perform light-on/off control of the headlight 10B using a single (fixed) light adjustment time TS2, under a premise that the time lag dT hardly changes. The more preferable of the embodiments depends on the discomfort in the user caused by a difference in the light-on/off completion timings and a variation width of the time lag dT.

Furthermore, as another example, an example in which the present invention is applied only to either of light-on control and light-off control can be considered. In still another example, the vehicle control system 1 may be configured such that both light adjustment times TS1 and TS2 are change based on the time lag dT.

In addition, the present invention is not limited to application to the control system of the headlights 10A and 10B. The present invention can be applied to control systems for various lamps, such as left and right brake lamps, that require synchronism in light-on/off In addition, the vehicle control system 1 may be configured such that only either of the elapsed times T1 and T2 is measured, and selection of the control mode (changing of the light adjustment time TS2) is performed based only on the either of the elapsed times T1 and T2. When only either of the times T1 and T2 tends to vary, the vehicle control system 1 may be configured such that only the more easily varied time of the times T1 and T2 is measured.

Figure 12:
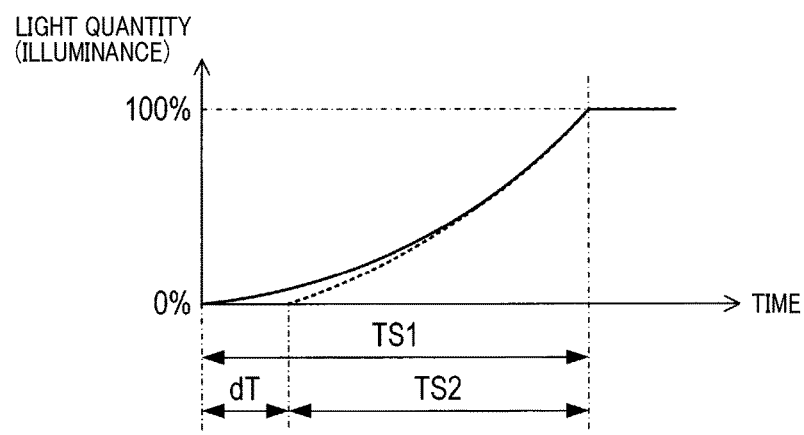
FIG. 12 is a graph of changes in light quantity of left and right headlights in a vehicle control system of a variation example.

In addition, as shown in FIG. 12, light-on control of the headlights 10A and 10B may be performed such that the light quantity of the headlight 10B catches up to the light quantity of the headlight 10A before the light quantity of the headlight 10A reaches 100%, and thereafter, the light quantities of the headlights 10A and 10B increase in a similar manner. This similarly applies to light-off control.

[Correspondence]

Lastly, the correspondence between terms will be described. The main headlight control apparatus 20 corresponds to an example of a first control apparatus. The auxiliary headlight control apparatus 30 corresponds to an example of a second control apparatus. The headlight 10A corresponds to an example of a first lamp. The headlight 10B corresponds to an example of a second lamp. In addition, the light adjustment time TS1 corresponds to a first transition time. The light adjustment time TS2 corresponds to a second transition time.

REFERENCE SIGNS LIST

1: vehicle control system
3: vehicle
10A, 10B: headlight
20: main headlight control apparatus
21: control unit
23: drive unit
25: first communication unit 27: second communication unit
30: auxiliary headlight control apparatus
31: control unit
33: drive unit
37: communication unit
40: body ECU
50A: switch
50B: sensor
211: CPU
213: ROM
215: RAM
217: counter
311: CPU
313: ROM
315: RAM
317: counter
B11: first communication process block
B12: determination process block
B13: headlight control block
B14: second communication process block
B21: communication block
B22: determination block
B23: headlight control block
LN: communication line
NT: on-board network

The invention claimed is:

1. A vehicle control system comprising:
a first control apparatus that controls a first lamp mounted in a vehicle; and
a second control apparatus that controls a second lamp mounted in the vehicle, wherein:
the first control apparatus starts light-on/off control of the first lamp under a condition that a light-on/off command is inputted, and thereby turns on/off the first lamp such that a light quantity of the first lamp is gradually changed over a first transition time that is an amount of time from the start of light-on/off control of the first lamp to when the light quantity of the first lamp reaches a target and light-on/off is completed, and meanwhile, inputs an auxiliary light-on/off command to the second control apparatus;
the second control apparatus starts light-on/off control of the second lamp under a condition that the auxiliary light-on/off command is inputted from the first control apparatus, and thereby turns on/off the second lamp such that a light quantity of the second lamp is gradually changed over a second transition time that is an amount of time from the start of light-on/off control of the second lamp to when the light quantity of the second lamp reaches a target and light-on/off is completed;
the first transition time is longer than the second transition time by an amount of time corresponding to a time lag from the start of light-on/off control of the first lamp to the start of light-on/off control of the second lamp;
the first control apparatus inputs a command delay time that is an amount of time from the start of light-on/off control of the first lamp to the input of the auxiliary light-on/off command, to the second control apparatus; and
the second control apparatus sets the second transition time to be shorter than the first transition time by an amount of time corresponding to the time lag, based on the command delay time inputted from the first control apparatus.

2. A vehicle control system comprising:
a first control apparatus that controls a first lamp mounted in a vehicle; and
a second control apparatus that controls a second lamp mounted in the vehicle, wherein:
the first control apparatus starts light-on/off control of the first lamp under a condition that a light-on/off command is inputted, and thereby turns on/off the first lamp such that a light quantity of the first lamp is gradually changed over a first transition time that is an amount of time from the start of light-on/off control of the first lamp to when the light quantity of the first lamp reaches a target and light-on/off is completed, and meanwhile, inputs an auxiliary light-on/off command to the second control apparatus;
the second control apparatus starts light-on/off control of the second lamp under a condition that the auxiliary light-on/off command is inputted from the first control apparatus, and thereby turns on/off the second lamp such that a light quantity of the second lamp is gradually changed over a second transition time that is an amount of time from the start of light-on/off control of the second lamp to when the light quantity of the second lamp reaches a target and light-on/off is completed;
the first transition time is longer than the second transition time by an amount of time corresponding to a time lag from the start of light-on/off control of the first lamp to the start of light-on/off control of the second lamp; and
the second control apparatus sets the second transition time to be shorter than the first transition time by an amount of time corresponding to the time lag, based on a process delay time that is an amount of time from the input of the auxiliary light-on/off command to the start of light-on/off control of the second lamp.

3. A vehicle control system comprising:
a first control apparatus that controls a first lamp mounted in a vehicle; and
a second control apparatus that controls a second lamp mounted in the vehicle, wherein:
the first control apparatus starts light-on/off control of the first lamp under a condition that a light-on/off command is inputted, and thereby turns on/off the first lamp such that a light quantity of the first lamp is gradually changed over a first transition time that is an amount of time from the start of light-on/off control of the first lamp to when the light quantity of the first lamp reaches a target and light-on/off is completed, and meanwhile, inputs an auxiliary light-on/off command to the second control apparatus;
the second control apparatus starts light-on/off control of the second lamp under a condition that the auxiliary light-on/off command is inputted from the first control apparatus, and thereby turns on/off the second lamp such that a light quantity of the second lamp is gradually changed over a second transition time that is an amount of time from the start of light-on/off control of the second lamp to when the light quantity of the second lamp reaches a target and light-on/off is completed;
the first transition time is longer than the second transition time by an amount of time corresponding to a time lag from the start of light-on/off control of the first lamp to the start of light-on/off control of the second lamp;
the first control apparatus inputs a command delay time that is an amount of time from the start of light-on/off control of the first lamp to the input of the auxiliary light-on/off command, to the second control apparatus; and the second control apparatus sets the second transition time to be shorter than the first transition time by an amount of time corresponding to the time lag, based on a process delay time that is an amount of time from the input of the auxiliary light-on/off command to the start of light-on/off control of the second lamp, and the command delay time inputted from the first control apparatus.

4. The vehicle control system according to claim 3, wherein:
the second control apparatus has a plurality of control modes with differing second transition times, selects one of the plurality of control modes, starts light-on/off control of the second lamp in the selected control mode, and by determining the control mode to be selected based on the command delay time and the process delay time, sets the second transition time to be shorter than the first transition time by an amount of time corresponding to the time lag.

5. The vehicle control system according to claim 4, wherein:
the first control apparatus is connected to an on-board network and receives the light-on/off command from an apparatus on the on-board network; and
the second control apparatus is connected to the first control apparatus by a communication line that is separate from the on-board network, and receives the auxiliary light-on/off command from the first control apparatus via the communication line.

6. The vehicle control system according to claim 5, wherein:
either of the first lamp and the second lamp is either of left and right headlights mounted in the vehicle; and
the other of the first lamp and the second lamp is the other of the left and right headlights.

7. The vehicle control system according to claim 1, wherein:
the first control apparatus is connected to an on-board network and receives the light-on/off command from an apparatus on the on-board network; and
the second control apparatus is connected to the first control apparatus by a communication line that is separate from the on-board network, and receives the auxiliary light-on/off command from the first control apparatus via the communication line.

8. The vehicle control system according to claim 1, wherein:
either of the first lamp and the second lamp is either of left and right headlights mounted in the vehicle; and
the other of the first lamp and the second lamp is the other of the left and right headlights.

9. The vehicle control system according to claim 2, wherein:
the first control apparatus is connected to an on-board network and receives the light-on/off command from an apparatus on the on-board network; and
the second control apparatus is connected to the first control apparatus by a communication line that is separate from the on-board network, and receives the auxiliary light-on/off command from the first control apparatus via the communication line.

10. The vehicle control system according to claim 2, wherein:
either of the first lamp and the second lamp is either of left and right headlights mounted in the vehicle; and
the other of the first lamp and the second lamp is the other of the left and right headlights.

11. The vehicle control system according to claim 3, wherein:
the first control apparatus is connected to an on-board network and receives the light-on/off command from an apparatus on the on-board network; and
the second control apparatus is connected to the first control apparatus by a communication line that is separate from the on-board network, and receives the auxiliary light-on/off command from the first control apparatus via the communication line.

12. The vehicle control system according to claim 3, wherein:
either of the first lamp and the second lamp is either of left and right headlights mounted in the vehicle; and
the other of the first lamp and the second lamp is the other of the left and right headlights.

* * * * *